United States Patent
Li

(10) Patent No.: US 11,184,518 B2
(45) Date of Patent: Nov. 23, 2021

(54) FOCUSING METHOD USING COMPENSATED FV VALUE, STORAGE MEDIUM AND MOBILE PHONE FOR PERFORMING THE SAME

(71) Applicant: GUANGDONG OPPO MOBILE TELECOMMUNICATIONS CORP., LTD., Guangdong (CN)

(72) Inventor: Xiaopeng Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 133 days.

(21) Appl. No.: 16/621,603

(22) PCT Filed: May 30, 2018

(86) PCT No.: PCT/CN2018/088929
§ 371 (c)(1),
(2) Date: Dec. 11, 2019

(87) PCT Pub. No.: WO2018/228184
PCT Pub. Date: Dec. 20, 2018

(65) Prior Publication Data
US 2020/0106948 A1 Apr. 2, 2020

(30) Foreign Application Priority Data
Jun. 16, 2017 (CN) .......................... 201710459601.2

(51) Int. Cl.
*H04N 5/232* (2006.01)
*G03B 13/36* (2021.01)

(52) U.S. Cl.
CPC ......... *H04N 5/23212* (2013.01); *G03B 13/36* (2013.01); *H04N 5/23219* (2013.01); *H04N 5/23229* (2013.01); *H04N 5/23245* (2013.01)

(58) Field of Classification Search
CPC .......... H04N 5/23212; H04N 5/23219; H04N 5/23229; H04N 5/23245; H04N 5/23258;
(Continued)

(56) References Cited

U.S. PATENT DOCUMENTS 6,081,668 A * 6/2000 Furuyama ................ G02B 7/28
396/104
2010/0026819 A1* 2/2010 Koh .................. H04N 5/232127
348/208.4
(Continued)

FOREIGN PATENT DOCUMENTS

CN 101207718 6/2008
CN 101339347 1/2009
(Continued)

OTHER PUBLICATIONS

EPO, European Extended Search Report for EP Application No. 18818807.2, dated Aug. 12, 2020.
(Continued)

*Primary Examiner* — Hung H Lam
(74) *Attorney, Agent, or Firm* — Hodgson Russ LLP

(57) ABSTRACT

A focusing method, a computer readable storage medium and a mobile phone are provided. The focusing method includes: acquiring an fv value corresponding to a current frame, when detecting that a rotation angular velocity value corresponding to the current frame is greater than a first threshold during a first scan configured to acquire a focusing area; compensating the fv value corresponding to the current frame to obtain a compensated fv value, when detecting that a difference between the focus value fv corresponding to the current frame and an fv value corresponding to a previous frame is greater than a second threshold; and focusing with the compensated fv value.

20 Claims, 4 Drawing Sheets

--- acquiring an fv value corresponding to a current frame, when detecting that a rotation angular velocity value corresponding to the current frame is greater than a first threshold during a first scan configured to acquire a focusing area — S102

↓ compensating the fv value corresponding to the current frame to obtain a compensated fv value, when detecting that a difference between the focus value fv corresponding to the current frame and an fv value corresponding to a previous frame is greater than a second threshold — S104

↓ focusing with the compensated fv value — S106

(58) Field of Classification Search
CPC ......... H04N 5/23287; H04N 5/232123; G03B 13/36
See application file for complete search history.

(56) References Cited

U.S. PATENT DOCUMENTS

| | | | |
|---|---|---|---|
| 2010/0060780 A1* | 3/2010 | Shibagami | G02B 7/36 348/345 |
| 2010/0141801 A1* | 6/2010 | Okamoto | H04N 5/232123 348/240.3 |
| 2011/0176015 A1 | 7/2011 | Yun | |
| 2014/0009636 A1 | 1/2014 | Lee et al. | |
| 2016/0065834 A1 | 3/2016 | Chang et al. | |
| 2018/0164542 A1* | 6/2018 | Wakazono | G03B 3/10 |

FOREIGN PATENT DOCUMENTS

| | | |
|---|---|---|
| CN | 102169276 | 8/2011 |
| CN | 103108128 | 5/2013 |
| CN | 103354599 | 10/2013 |
| CN | 103562769 | 2/2014 |
| CN | 103685918 | 3/2014 |
| CN | 104618654 | 5/2015 |
| CN | 105072328 | 11/2015 |
| CN | 105357429 | 2/2016 |
| CN | 105391945 | 3/2016 |
| CN | 105430279 | 3/2016 |
| CN | 105516668 | 4/2016 |
| CN | 106341596 | 1/2017 |
| CN | 106506973 | 3/2017 |
| CN | 106713750 | 5/2017 |
| CN | 106791434 | 5/2017 |
| CN | 107197152 | 9/2017 |
| EP | 2701380 | 2/2014 |
| JP | 2010096790 | 4/2010 |
| WO | 2016173225 A1 | 11/2016 |

OTHER PUBLICATIONS

EPO, Office Action for EP Application No. 18818807.2, dated May 7, 2020.
SIPO, Notification to Grant Patent Right for Invention for CN Application No. 201710459601.2, dated Nov. 26, 2019.
India Patent Office, Examination Report for IN Application No. 202017001945, dated Jan. 16, 2020.
WIPO, ISR for PCT/CN2018/088929, Aug. 22, 2018.
SIPO, First Office Action for CN Application No. 201710459601.2, dated Apr. 28, 2019.
SIPO, Second Office Action for CN Application No. 201710459601.2, dated Aug. 13, 2019.

* cited by examiner

FOCUSING METHOD USING COMPENSATED FV VALUE, STORAGE MEDIUM AND MOBILE PHONE FOR PERFORMING THE SAME

CROSS-REFERENCE TO RELATED APPLICATION

This application is a U.S. national phase application of International Application No. PCT/CN2018/088929, filed on May 30, 2018, which claims priority to Chinese Patent Application No. 201710459601.2, filed on Jun. 16, 2017. The entire disclosures of the aforementioned applications are incorporated herein by reference.

TECHNICAL FIELD

The present disclosure relates to computer technologies, and in particular, to a focusing method and a device, a computer readable storage medium, and a mobile terminal.

BACKGROUND

With the development of intelligent mobile phones, the use of smart mobile phones for photographing is more and more frequent, and the requirements for the shooting effects of smart mobile phones are becoming higher and higher. When shooting an object with a camera, the camera needs to determine the focal length that can be clearly imaged, and then shoot the object at the focal length, so that the captured image is clearly imaged.

SUMMARY

An embodiment of the present disclosure provides a focusing method, a device, a computer readable storage medium, and a mobile terminal, and the problem of defocus caused by hand shaking under dark light conditions may be prevented.

A focusing method comprising:
acquiring an fv value corresponding to a current frame, when detecting that a rotation angular velocity value corresponding to the current frame is greater than a first threshold during a first scan configured to acquire a focusing area;
compensating the fv value corresponding to the current frame to obtain a compensated fv value, when detecting that a difference between the focus value fv corresponding to the current frame and an fv value corresponding to a previous frame is greater than a second threshold; and
focusing with the compensated fv value.

A focusing device, comprising:
an acquiring module, configured to acquire an fv value corresponding to a current frame, when detecting that a rotation angular velocity value corresponding to the current frame is greater than a first threshold during a first scan configured to acquire a focusing area;
a compensation module, configured to compensate the fv value corresponding to the current frame to obtain a compensated fv value, when detecting that a difference between the focus value fv corresponding to the current frame and an fv value corresponding to a previous frame is greater than a second threshold; and
a focusing module, configured to focus with the compensated fv value.

A mobile terminal, comprising a memory and a processor, wherein the memory stores a computer program, and the computer program is executed by the processor to perform the following steps:
acquiring an fv value corresponding to a current frame, when detecting that a rotation angular velocity value corresponding to the current frame is greater than a first threshold during a first scan configured to acquire a focusing area;
compensating the fv value corresponding to the current frame to obtain a compensated fv value, when detecting that a difference between the focus value fv corresponding to the current frame and an fv value corresponding to a previous frame is greater than a second threshold; and
focusing with the compensated fv value.

A computer readable storage medium, configured to store a computer program, the computer program being executed by a processor to perform the following steps:
acquiring an fv value corresponding to a current frame, when detecting that a rotation angular velocity value corresponding to the current frame is greater than a first threshold during a first scan configured to acquire a focusing area;
compensating the fv value corresponding to the current frame to obtain a compensated fv value, when detecting that a difference between the focus value fv corresponding to the current frame and an fv value corresponding to a previous frame is greater than a second threshold; and
focusing with the compensated fv value.

BRIEF DESCRIPTION OF THE DRAWINGS

In order to more clearly illustrate the technical solutions of the embodiments of the present disclosure, the drawings used in the description of the embodiments will be briefly described below. The drawings in the following description are only some embodiments of the present disclosure. For the skilled person in the art, other drawings can be obtained from these drawings without any creative work.

DETAILED DESCRIPTION

In order to make the objects, technical solutions and advantages of the present disclosure more clear, the present disclosure will be further described in detail below with reference to the accompanying drawings and embodiments. It is understood that the specific embodiments described herein are merely illustrative of the disclosure and are not intended to be limiting.

Figure 1:
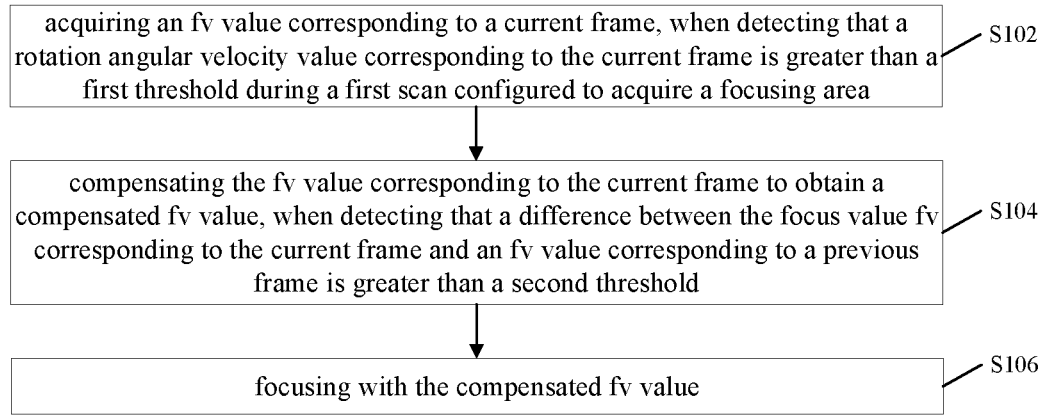
FIG. 1 is a flow chart of a focusing method in one embodiment.

FIG. 1 is a flow chart of a focusing method in one embodiment. Referring to FIG. 1, a focusing method includes step 102 to step 106.

Step 102: acquiring an fv value corresponding to a current frame, when detecting that a rotation angular velocity value corresponding to the current frame is greater than a first threshold during a first scan configured to acquire a focusing area.

Specifically, the first scan refers to a precise scan. Focusing in a mobile phone may include pre scan and precise scan. The pre can is pre scan. A focus range of a lens focus position may be obtained by the pre scan. The precise scan is also named as fine scan. A lens focus position may be obtained by the precise scan. During the precise scan, the rotational angular velocity value corresponding to the current frame may be obtained. The rotational angular velocity value may be obtained by a gyro detector of the mobile phone. When the rotational angular velocity value corresponding to the current frame is greater than the preset first threshold, the current frame is determined jitter, and the fv (Focus Value) value corresponding to the current frame is obtained. The fv value is a value that is positively correlated with the image sharpness. The higher the sharpness, the larger the fv value of the image is.

Step 104: compensating the fv value corresponding to the current frame to obtain a compensated fv value, when detecting that a difference between the focus value fv corresponding to the current frame and an fv value corresponding to a previous frame is greater than a second threshold.

Specifically, when the mobile phone detects that the rotational angular velocity value corresponding to the current frame being greater than the first threshold, and the difference between the fv value corresponding to the current frame and the fv value corresponding to the previous frame being greater than the second threshold, the fv value corresponding to the current frame is determined to be abnormal. In a dark environment, which has an insufficient light, an exposure time of the mobile phone increases during shooting, and the jitter of the mobile phone causes the current frame to be blurred and the picture sharpness to be lowered, and the fv value corresponding to the current frame in the dark environment is smaller than that of the normal environment, thus a deviation occurs. In this condition, the fv value corresponding to the current frame should to be compensated to reduce the influence of the jitter on the focus.

In step 106, focusing with the compensated fv value.

During the precise scan, after the fv value corresponding to the current frame is compensated, the mobile phone continues to perform precise scan to obtaining the rotational angular velocity value and the fv value corresponding to each frame in real time. When the rotational angular velocity value is greater than the first threshold, and the difference between the fv value corresponding to the current frame and the fv value of the previous frame is greater than the second threshold, the fv value corresponding to the current frame is compensated, and real-time focusing is performed according to the compensated fv value.

In the related art, when the camera is focused under dark light conditions, the jitter of the mobile phone may cause the picture sharpness to be lowered and the picture to be out of focus. The focusing method in the embodiment of the present disclosure may acquire the fv value corresponding to the current frame when detecting the jitter of the mobile phone, and compensates the fv value corresponding to the current frame when abnormal, thereby effectively solving the problem of imaging out-of-focus caused by the jitter of the mobile phone under the dark light condition, improving the focusing precision of the mobile phone in dark environment.

In an embodiment, compensating the fv value corresponding to the current frame to obtain a compensated fv value in step 104 includes: acquiring a fitting straight line according to two fv values respectively corresponding to two previous frame pictures of the current frame; and compensating the fv value corresponding to the current frame based on the fitting straight line.

Figure 2:
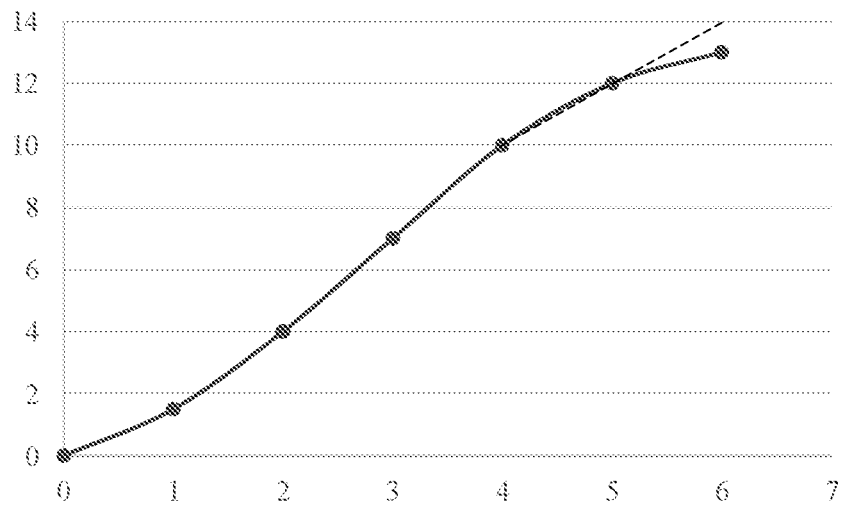
FIG. 2 is a line chart and a fitted straight line chart showing the relationship between different lens positions and fv values in one embodiment.

When the mobile phone detects that the fv value corresponding to the current frame is small than normal, that is, the fv value corresponding to the current frame is deviated, the fv value corresponding to the current frame is compensated. The step of compensating the fv value includes: obtaining two fv values corresponding to two previous frames relative to the current frame, obtaining a fitting straight line based on the two fv values corresponding to the two previous frames, and obtaining the compensated fv value corresponding to the current frame based on the fitted straight line. Referring to FIG. 2, the horizontal axis coordinate in the line graph of FIG. 2 successively represents the first frame, the second frame, . . . and the sixth frame in the precise scan, and the left side of the vertical axis represents the fv value corresponding to each frame. When the mobile phone detects that the rotational angular velocity value of the sixth frame is greater than the first threshold, and the difference between the fv value corresponding to the sixth frame and the fv value corresponding to the fifth frame is greater than the second threshold, the mobile phone acquires the fv value, 10, corresponding to the fourth frame, and the fv value, 12, corresponding to the fifth frame. Referring to FIG. 2, a straight line is fitted based on the fv value corresponding to the fourth frame and the fv value corresponding to the fifth frame, and the compensated fv value corresponding to the sixth frame is obtained based on the fitting straight line to be 14, thus the fv value corresponding to the sixth frame is adjusted to be 14, and the fv value corresponding to the sixth frame is compensated.

In the embodiment of the present disclosure, when the fv value of the current frame is abnormal, a fv value fitted straight line based on the fv value of the two previous frames is applied to obtain the compensated fv value corresponding to the current frame to ensure the accuracy of the compensated fv value.

In an embodiment, the fv value corresponding to the current frame is compensated in step 104, including: acquiring an average value of an fv value corresponding to a previous frame of the current frame and an fv value corresponding to a next frame of the current frame; and taking the average value as the compensated fv value corresponding to the current frame.

When the mobile phone detects that the fv value of the current frame is too small, that is, the fv value of the current frame is deviated, the fv value corresponding to the current frame is compensated. The step of compensating the fv value includes: obtaining a next frame relative to the current frame by the precise scan, and when the rotational angular velocity value of the next frame is within the first threshold, acquiring the fv value corresponding to the next frame, and obtaining the average fv value of the fv value corresponding to the previous frame and the fv value corresponding to the next frame; taking the average fv value as the compensated fv value corresponding to the current frame. For example, during the precise scan, when the mobile phone detects that the rotational angular velocity value of the sixth frame is greater than the first threshold, and the difference between the fv value of the sixth frame and the fv value of the fifth frame is greater than the second threshold, the precise scan is continued to obtain the seventh frame to obtain the rotational angular velocity value of the seventh frame. When the rotational angular velocity value of the seventh frame is within the first threshold, the fv value of the seventh frame is obtained. The average value of the fv value of the fifth frame and the fv value of the seventh frame is taken as the compensated fv value of the sixth frame.

In the embodiment of the present disclosure, when the fv value of the current frame is abnormal, the average value obtained based on the fv value of the previous frame and the next frame is taken as the compensated fv value of the current frame to ensure the accuracy of the compensated fv value.

In one embodiment, before acquiring the focusing area by the first scan in step S102, the focusing method includes: acquiring a focus range by a second scan, the step of acquiring the focus range by the second scan comprising: acquiring the fv value corresponding to the current frame, when the fv value corresponding to the current frame being greater than an fv value corresponding to a previous frame, continuing the second scan until the fv value corresponding to the current frame being smaller than the fv value of the previous frame.

Figure 3:
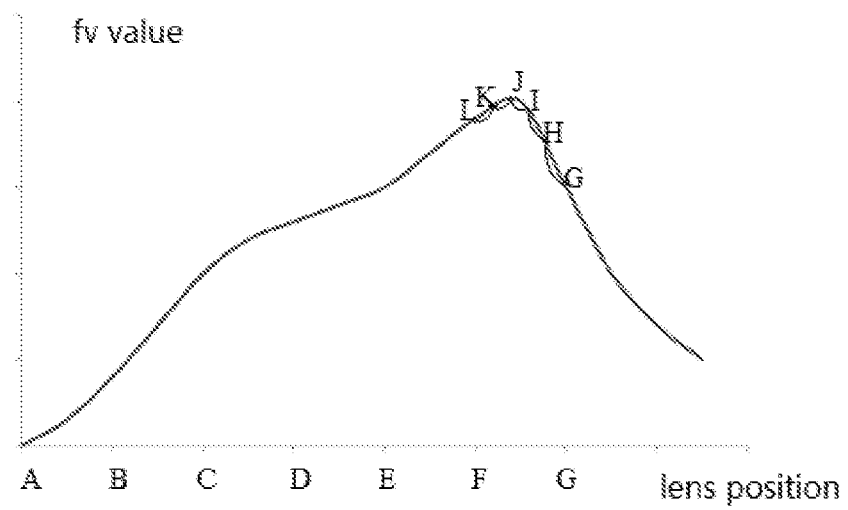
FIG. 3 is a line diagram showing the relationship between the lens position and the fv value in one embodiment.

The second scan refers to a pre scan. The mobile phone obtains an approximate range of the focus position of the camera lens by the pre scan. Referring to the line graph of FIG. 3, the abscissa represents the lens position, and the ordinate represents the fv value corresponding to the lens position. During the pre scan, the mobile phone drives the camera lens to perform a search with a larger step size. For example, if the total stroke that a motor of the camera can drive is 1000, the step size of the lens driven by the motor is set to 80 during the pre scan, that is, the motor drives the camera lens at a distance of 80 each time, and obtain the fv value corresponding to each frame corresponding to each lens position. Referring to FIG. 3, the camera lens is driven from the point A to the point B, from the point B to the point C, the point C to the point D, the point D to the point E, the point E to the point F, the point F to the point G. During the process from the point A to the point F, the fv value corresponding to the lens position gradually increases. During the process from the point F to the point G, the fv value corresponding to the lens position gradually decreases. Then it means that the camera lens has been passed across a lens position that corresponding to the maximum fv value. Thus, the pre scan is ended, and the precise scan is followed.

In one embodiment, focusing with the compensated fv value includes: acquiring three fv values corresponding to three consecutive frames, in which an fv value corresponding to an intermediate frame of the three frames is greater than an fv value corresponding to a previous frame, and the fv value of the intermediate frame is greater than an fv value corresponding to a next frame; acquiring a fitting curve based on the three fv values; and driving a camera lens to a position corresponding to an apex of the fitting curve and focusing thereby.

Figure 4:
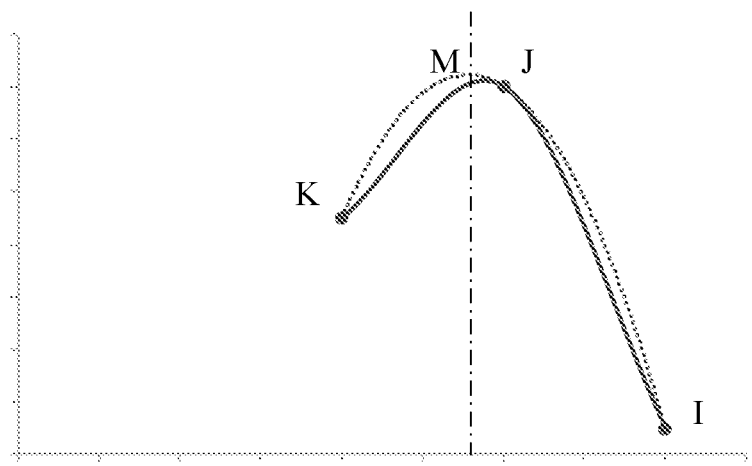
FIG. 4 is a line diagram and a fitting curve diagram of a relationship between a lens position and an fv value in one embodiment.

In the precise scan, the mobile phone compensates the fv value corresponding to the frame obtained in the precise scan in real time, and focuses according to the compensated fv value. Referring to FIG. 3, when the motor drives the camera lens to reach the G point to complete the pre scan, the precise scan begins. During the precise scan, the step size of the lens driven by the motor is smaller than the pre scan, such as a distance of 30 per drive. The lens driven by the motor is moved back from the G point by 5 steps, that is, from the G point to the H point, from the H point to the I point, from the I point to the J point, from the J point to the K point, from the K point to the L point. In the process from the G point to the J point, the fv value of the lens position gradually increases. In the process from the J point to the point L, the fv value of the lens position gradually decreases. That is, the fv value corresponding to the J point lens position is higher than the fv value corresponding to the I point and the K point. Referring to FIG. 4, a parabola is fitted according to the fv value of the I point, the J point, and the K point to the corresponding lens position, and an apex of the parabola is obtained as the M point. Then the lens is driven by the motor to the lens position corresponding to the M point, which has the highest fv value. The lens focus is completed.

In one embodiment, a focusing method includes:
Obtaining a focal length of a lens position when a first camera is in focus;
Obtaining a lens position of a second camera corresponding to the focal length;
Driving the a lens of the second camera to the lens position of the second camera and focusing thereby.

The steps in the method flowchart of the embodiment of the present disclosure are sequentially displayed in accordance with the indication of the arrow, but the steps are not necessarily performed in the order indicated by the arrow. Except as explicitly stated herein, the execution of these steps is not strictly limited, and may be performed in other sequences. Moreover, at least some of the steps in the method flowchart of the embodiment of the present disclosure may include multiple sub-steps or multiple stages, which are not necessarily performed at the same time, but may be executed at different times. The order of execution is not necessarily performed sequentially, but may be performed alternately or alternately with at least a portion of other steps or sub-steps or stages of other steps.

Figure 5:
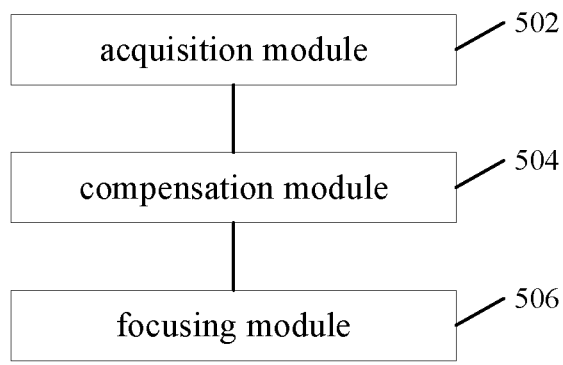
FIG. 5 is a block diagram showing a structure of a focusing device in an embodiment.

FIG. 5 is a block diagram showing the structure of a focusing device in an embodiment. Referring to FIG. 5, a focusing device includes an acquisition module 502, a compensation module 504, and a focusing module 506.

The acquisition module 502 is configured to acquire an fv value corresponding to a current frame, when detecting that a rotation angular velocity value corresponding to the current frame is greater than a first threshold during a first scan configured to acquire a focusing area.

The compensation module 504 is configured to compensate the fv value corresponding to the current frame to obtain a compensated fv value, when detecting that a difference between the focus value fv corresponding to the current frame and an fv value corresponding to a previous frame is greater than a second threshold.

The focusing module 506 is configured to focus with the compensated fv value.

In an embodiment, the compensation module 504 is further configured to: acquire a fitting straight line according to two fv values respectively corresponding to two previous frame pictures of the current frame; and compensate the fv value corresponding to the current frame based on the fitting straight line.

In one embodiment, the compensation module 504 is further configured to: acquire an average value of an fv value corresponding to a previous frame of the current frame and an fv value corresponding to a next frame of the current frame; and take the average value as the compensated fv value corresponding to the current frame.

In an embodiment, the focusing module 506 is further configured to: acquire three fv values corresponding to three consecutive frames, in which an fv value corresponding to an intermediate frame of the three frames is greater than an fv value corresponding to a previous frame, and the fv value of the intermediate frame is greater than an fv value corresponding to a next frame; acquire a fitting curve based on the three fv values; and drive a camera lens to a position corresponding to an apex of the fitting curve and focusing thereby.

Figure 6:
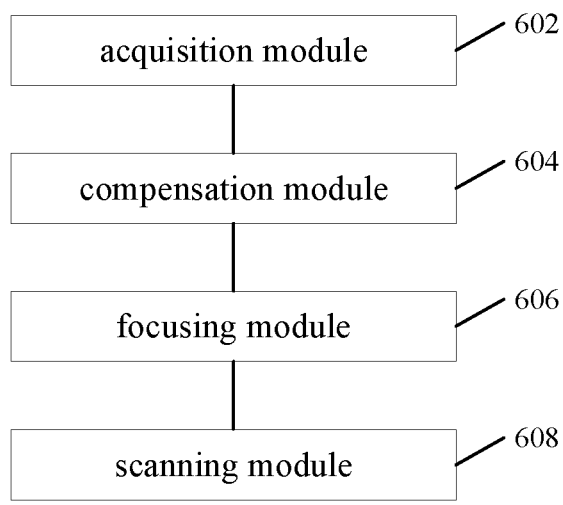
FIG. 6 is a structural block diagram of a focusing device in another embodiment.

FIG. 6 is a block diagram showing the structure of a focusing method in another embodiment. Referring to FIG. 6, a focusing device includes an acquisition module 602, a compensation module 604, a focusing module 606 and a scanning module 608. The acquisition module 602, the compensation module 604, and the focusing module 606 have the corresponding functions as the acquisition module 502, the compensation module 504, and the focusing module 506 in FIG. 5.

The scanning module 608 is configured to, before the focusing area by the first scan, acquire the focus range by the second scan comprising, which includes to acquire the fv value corresponding to the current frame, when the fv value corresponding to the current frame being greater than an fv value corresponding to a previous frame, continue the second scan until the fv value corresponding to the current frame being smaller than the fv value of the previous frame.

The division of each module in the above focusing device is for illustrative purposes only. In other embodiments, the focusing device may be divided into different modules as needed to complete all or part of the functions of the focusing device.

In one embodiment, a focusing device includes:

An acquiring module, configured to obtain a focal length of a lens position when a first camera is in focus, and obtain a lens position of a second camera corresponding to the focal length;

And a driving module, configured to drive the lens of the second camera to the lens position of the second camera and focusing thereby.

Each of the above-described focusing devices may be implemented in whole or in part by software, hardware, and combinations thereof. Each of the above modules may be embedded in or independent of the processor in the server, or may be stored in a memory in the server in a software form, so that the processor calls to perform operations of the above modules. As used in this disclosure, the terms "component", "module" and "system" and the like are intended to mean a computer-related entity, which may be hardware, a combination of hardware and software, software, or software in execution. For example, a component can be, but is not limited to being, a process running on a processor, a processor, an object, an executable, a thread of execution, a program, and/or a computer. By way of illustration, both a disclosure running on a server and a server can be a component. One or more components can reside within a process and/or executed thread, and the components can be located within one computer and/or distributed between two or more computers.

The embodiment of the present disclosure also provides a computer readable storage medium. A computer readable storage medium stored a computer program thereon, the computer program is executed by the processor to implement the following steps:

(1) acquiring an fv value corresponding to a current frame, when detecting that a rotation angular velocity value corresponding to the current frame is greater than a first threshold during a first scan configured to acquire a focusing area.

Specifically, the first scan refers to a precise scan. Focusing in a mobile phone may include pre scan and precise scan. The pre can is pre scan. A focus range of a lens focus position may be obtained by the pre scan. The precise scan is also named as fine scan. A lens focus position may be obtained by the precise scan. During the precise scan, the rotational angular velocity value corresponding to the current frame may be obtained. The rotational angular velocity value may be obtained by a gyro detector of the mobile phone. When the rotational angular velocity value corresponding to the current frame is greater than the preset first threshold, the current frame is determined jitter, and the fv (Focus Value) value corresponding to the current frame is obtained. The fv value is a value that is positively correlated with the image sharpness. The higher the sharpness, the larger the fv value of the image is.

(2) compensating the fv value corresponding to the current frame to obtain a compensated fv value, when detecting that a difference between the focus value fv corresponding to the current frame and an fv value corresponding to a previous frame is greater than a second threshold.

Specifically, when the mobile phone detects that the rotational angular velocity value corresponding to the current frame being greater than the first threshold, and the difference between the fv value corresponding to the current frame and the fv value corresponding to the previous frame being greater than the second threshold, the fv value corresponding to the current frame is determined to be abnormal. In a dark environment, which has an insufficient light, an exposure time of the mobile phone increases during shooting, and the jitter of the mobile phone causes the current frame to be blurred and the picture sharpness to be lowered, and the fv value corresponding to the current frame in the dark environment is smaller than that of the normal environment, thus a deviation occurs. In this condition, the fv value corresponding to the current frame should to be compensated to reduce the influence of the jitter on the focus.

(3) focusing with the compensated fv value.

During the precise scan, after the fv value corresponding to the current frame is compensated, the mobile phone continues to perform precise scan to obtaining the rotational angular velocity value and the fv value corresponding to each frame in real time. When the rotational angular velocity value is greater than the first threshold, and the difference between the fv value corresponding to the current frame and the fv value of the previous frame is greater than the second threshold, the fv value corresponding to the current frame is compensated, and real-time focusing is performed according to the compensated fv value.

In an embodiment, compensating the fv value corresponding to the current frame to obtain a compensated fv value in step (2) includes: acquiring a fitting straight line according to two fv values respectively corresponding to two previous frame pictures of the current frame; and compensating the fv value corresponding to the current frame based on the fitting straight line.

When the mobile phone detects that the fv value corresponding to the current frame is small than normal, that is, the fv value corresponding to the current frame is deviated, the fv value corresponding to the current frame is compensated. The step of compensating the fv value includes: obtaining two fv values corresponding to two previous frames relative to the current frame, obtaining a fitting straight line based on the two fv values corresponding to the two previous frames, and obtaining the compensated fv value corresponding to the current frame based on the fitted straight line. Referring to FIG. 2, the horizontal axis coordinate in the line graph of FIG. 2 successively represents the first frame, the second frame, . . . and the sixth frame in the precise scan, and the left side of the vertical axis represents the fv value corresponding to each frame. When the mobile phone detects that the rotational angular velocity value of the sixth frame is greater than the first threshold, and the difference between the fv value corresponding to the sixth frame and the fv value corresponding to the fifth frame is greater than the second threshold, the mobile phone acquires the fv value, 10, corresponding to the fourth frame, and the fv value, 12, corresponding to the fifth frame. Referring to FIG. 2, a straight line is fitted based on the fv value corresponding to the fourth frame and the fv value corresponding to the fifth frame, and the compensated fv value corresponding to the sixth frame is obtained based on the fitting straight line to be 14, thus the fv value corresponding to the sixth frame is adjusted to be 14, and the fv value corresponding to the sixth frame is compensated.

In an embodiment, the fv value corresponding to the current frame is compensated in step (2), including: acquiring an average value of an fv value corresponding to a previous frame of the current frame and an fv value corresponding to a next frame of the current frame; and taking the average value as the compensated fv value corresponding to the current frame.

When the mobile phone detects that the fv value the current frame is too small, that is, the fv value of the current frame is deviated, the fv value corresponding to the current frame is compensated. The step of compensating the fv value includes: obtaining a next frame relative to the current frame by the precise scan, and when the rotational angular velocity value of the next frame is within the first threshold, acquiring the fv value corresponding to the next frame, and obtaining the average fv value of the fv value corresponding to the previous frame and the fv value corresponding to the next frame; taking the average fv value as the compensated fv value corresponding to the current frame. For example, during the precise scan, when the mobile phone detects that the rotational angular velocity value of the sixth frame is greater than the first threshold, and the difference between the fv value of the sixth frame and the fv value of the fifth frame is greater than the second threshold, the precise scan is continued to obtain the seventh frame to obtain the rotational angular velocity value of the seventh frame. When the rotational angular velocity value of the seventh frame is within the first threshold, the fv value of the seventh frame is obtained. The average value of the fv value of the fifth frame and the fv value of the seventh frame is taken as the compensated fv value of the sixth frame.

In one embodiment, before acquiring the focusing area by the first scan in step (1), the focusing method includes: acquiring a focus range by a second scan, the step of acquiring the focus range by the second scan comprising: acquiring the fv value corresponding to the current frame, when the fv value corresponding to the current frame being greater than an fv value corresponding to a previous frame, continuing the second scan until the fv value corresponding to the current frame being smaller than the fv value of the previous frame.

The second scan refers to a pre scan. The mobile phone obtains an approximate range of the focus position of the camera lens by the pre scan. Referring to the line graph of FIG. 3, the abscissa represents the lens position, and the ordinate represents the fv value corresponding to the lens position. During the pre scan, the mobile phone drives the camera lens to perform a search with a larger step size. For example, if the total stroke that a motor of the camera can drive is 1000, the step size of the lens driven by the motor is set to 80 during the pre scan, that is, the motor drives the camera lens at a distance of 80 each time, and obtain the fv value corresponding to each frame corresponding to each lens position. Referring to FIG. 3, the camera lens is driven from the point A to the point B, from the point B to the point C, the point C to the point D, the point D to the point E, the point E to the point F, the point F to the point G. During the process from the point A to the point F, the fv value corresponding to the lens position gradually increases. During the process from the point F to the point G, the fv value corresponding to the lens position gradually decreases. Then it means that the camera lens has been passed across a lens position that corresponding to the maximum fv value. Thus, the pre scan is ended, and the precise scan is followed.

In one embodiment, focusing with the compensated fv value includes: acquiring three fv values corresponding to three consecutive frames, in which an fv value corresponding to an intermediate frame of the three frames is greater than an fv value corresponding to a previous frame, and the fv value of the intermediate frame is greater than an fv value corresponding to a next frame; acquiring a fitting curve based on the three fv values; and driving a camera lens to a position corresponding to an apex of the fitting curve and focusing thereby.

In the precise scan, the mobile phone compensates the fv value corresponding to the frame obtained in the precise scan in real time, and focuses according to the compensated fv value. Referring to FIG. 3, when the motor drives the camera lens to reach the G point to complete the pre scan, the precise scan begins. During the precise scan, the step size of the lens driven by the motor is smaller than the pre scan, such as a distance of 30 per drive. The lens driven by the motor is moved back from the G point by 5 steps, that is, from the G point to the H point, from the H point to the I point, from the I point to the J point, from the J point to the K point, from the K point to the L point. In the process from the G point to the J point, the fv value of the lens position gradually increases. In the process from the J point to the point L, the fv value of the lens position gradually decreases. That is, the fv value corresponding to the J point lens position is higher than the fv value corresponding to the I point and the K point. Referring to FIG. 4, a parabola is fitted according to the fv value of the I point, the J point, and the K point to the corresponding lens position, and an apex of the parabola is obtained as the M point. Then the lens is driven by the motor to the lens position corresponding to the M point, which has the highest fv value. The lens focus is completed.

Figure 7:
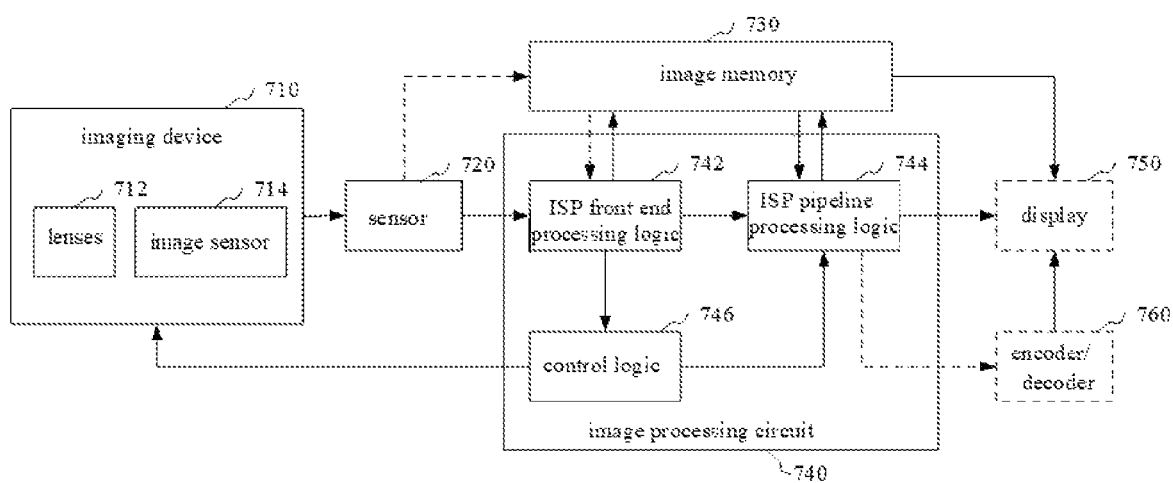
FIG. 7 is a schematic illustration of an image processing circuit in one embodiment.

The embodiment of the present disclosure further provides a mobile phone. The mobile phone includes an image processing circuit, and the image processing circuit may be implemented by using hardware and/or software components, and may include various processing units defining an ISP (Image Signal Processing) pipeline. FIG. 7 is a schematic illustration of an image processing circuit in one embodiment. Referring to FIG. 7, for convenience of explanation, only various aspects of the image processing art related to the embodiment of the present disclosure are shown.

Referring to FIG. 7, an image processing circuit 740 includes an ISP front end processing logic 742, an ISP pipeline processing logic 744, and a control logic 746. The image data captured by an imaging device 710 is first processed by the ISP front end processing logic 742, which analyzes the image data to capture one or more that can be used to determine control image statistics for parameters of the ISP pipeline processing logic 744 and/or the imaging device 710. The imaging device 710 may include a camera having one or more lenses 712 and an image sensor 714. The image sensor 714 may include a color filter array (such as a Bayer filter) that can capture light intensity and wavelength information captured by each imaging pixel of image sensor 714 and provide a group of raw image data processing processed by the ISP front end processing logic 742. For example, a sensor 720 receives the output of the imaging device 710 and provides raw image data to the ISP front end processing logic 742 based on the interface type of the sensor 720. The sensor 720 interface may utilize a SMIA (Standard Mobile Imaging Architecture) interface, other serial or parallel camera interfaces, or a combination of the above.

The ISP front end processing logic 742 processes the raw image data pixel by pixel in a variety of formats. For example, each image pixel can have a bit depth of 8, 10, 12, or 14 bits, and ISP front end processing logic 742 can perform one or more image processing operations on the raw image data, collecting statistical information about the image data. Among them, image processing operations can be performed with the same or different bit depth precision.

The ISP front end processing logic 742 can also receive pixel data from the image memory 730. For example, raw pixel data is sent from the sensor 720 interface to the image memory 730, which is then provided to the ISP front end processing logic 742 for processing. The image memory 730 can be part of a memory device, a storage device, or a separate dedicated memory within an electronic device, and can include DMA (Direct Memory Access) features.

When receiving raw image data from sensor 720 interface or from image memory 730, the ISP front end processing logic 742 can perform one or more image processing operations, such as time domain filtering. The processed image data can be sent to the ISP pipeline processing logic 744 or the image memory 730 for additional processing prior to being displayed. The ISP pipeline processing logic 744 can also receive "front end" processing data directly from the ISP front end processing logic 742, or receive "front end" processing data from the image memory 730, and perform "front end" processing data in the original domain as well as RGB and YCbCr. Image data processing in color space. The image data processed by the ISP pipeline processing logic 744 can be output to the display 750 for viewing by the user and/or further processed by a graphics engine or a GPU (Graphics Processing Unit). Additionally, the output of ISP pipeline processing logic 744 can also be sent to the image memory 730, and the display 750 can read image data from the image memory 730. In one embodiment, the image memory 730 can be configured to implement one or more frame buffers. Additionally, the output of the ISP pipeline processing logic 744 can be sent to the encoder/decoder 760 to encode/decode image data. The encoded image data can be saved and decompressed before being displayed on the display 750 device.

The statistics determined by the ISP front end processing logic 742 can be sent to the control logic 746 unit. For example, the statistics may include image sensor 714 statistics such as auto exposure, auto white balance, auto focus, flicker detection, black level compensation, lens 712 shading correction, and the like. The control logic 746 may include a processor and/or a microcontroller that executes one or more routines, such as firmware, and one or more routines can determine control parameters of the imaging device 710 and ISP pipelines based on received statistical data. The control parameters of the logic 744 are processed. For example, the control parameters may include the sensor 720 control parameters (e.g., gain, integration time for exposure control), camera flash control parameters, lens 712 control parameters (e.g., focus or zoom focal length), or a combination of these parameters. The ISP control parameters may include a gain level and color correction matrix for automatic white balance and color adjustment (e.g., during RGB processing), and a lens 712 shading correction parameter.

The following are the steps to implement the focusing method using the image processing circuit of FIG. 7:

(1) acquiring an fv value corresponding to a current frame, when detecting that a rotation angular velocity value corresponding to the current frame is greater than a first threshold during a first scan configured to acquire a focusing area.

Specifically, the first scan refers to a precise scan. Focusing in a mobile phone may include pre scan and precise scan. The pre can is pre scan. A focus range of a lens focus position may be obtained by the pre scan. The precise scan is also named as fine scan. A lens focus position may be obtained by the precise scan. During the precise scan, the rotational angular velocity value corresponding to the current frame may be obtained. The rotational angular velocity value may be obtained by a gyro detector of the mobile phone. When the rotational angular velocity value corresponding to the current frame is greater than the preset first threshold, the current frame is determined jitter, and the fv (Focus Value) value corresponding to the current frame is obtained. The fv value is a value that is positively correlated with the image sharpness. The higher the sharpness, the larger the fv value of the image is.

(2) compensating the fv value corresponding to the current frame to obtain a compensated fv value, when detecting that a difference between the focus value fv corresponding to the current frame and an fv value corresponding to a previous frame is greater than a second threshold.

Specifically, when the mobile phone detects that the rotational angular velocity value corresponding to the current frame being greater than the first threshold, and the difference between the fv value corresponding to the current frame and the fv value corresponding to the previous frame being greater than the second threshold, the fv value corresponding to the current frame is determined to be abnormal. In a dark environment, which has an insufficient light, an exposure time of the mobile phone increases during shooting, and the jitter of the mobile phone causes the current frame to be blurred and the picture sharpness to be lowered, and the fv value corresponding to the current frame in the dark environment is smaller than that of the normal environment, thus a deviation occurs. In this condition, the fv value corresponding to the current frame should to be compensated to reduce the influence of the jitter on the focus.

(3) focusing with the compensated fv value.

During the precise scan, after the fv value corresponding to the current frame is compensated, the mobile phone continues to perform precise scan to obtaining the rotational angular velocity value and the fv value corresponding to each frame in real time. When the rotational angular velocity value is greater than the first threshold, and the difference between the fv value corresponding to the current frame and the fv value of the previous frame is greater than the second threshold, the fv value corresponding to the current frame is compensated, and real-time focusing is performed according to the compensated fv value.

In an embodiment, compensating the fv value corresponding to the current frame to obtain a compensated fv value in step (2) includes: acquiring a fitting straight line according to two fv values respectively corresponding to two previous frame pictures of the current frame; and compensating the fv value corresponding to the current frame based on the fitting straight line.

When the mobile phone detects that the fv value corresponding to the current frame is small than normal, that is, the fv value corresponding to the current frame is deviated, the fv value corresponding to the current frame is compensated. The step of compensating the fv value includes: obtaining two fv values corresponding to two previous frames relative to the current frame, obtaining a fitting straight line based on the two fv values corresponding to the two previous frames, and obtaining the compensated fv value corresponding to the current frame based on the fitted straight line. Referring to FIG. 2, the horizontal axis coordinate in the line graph of FIG. 2 successively represents the first frame, the second frame, . . . and the sixth frame in the precise scan, and the left side of the vertical axis represents the fv value corresponding to each frame. When the mobile phone detects that the rotational angular velocity value of the sixth frame is greater than the first threshold, and the difference between the fv value corresponding to the sixth frame and the fv value corresponding to the fifth frame is greater than the second threshold, the mobile phone acquires the fv value, 10, corresponding to the fourth frame, and the fv value, 12, corresponding to the fifth frame. Referring to FIG. 2, a straight line is fitted based on the fv value corresponding to the fourth frame and the fv value corresponding to the fifth frame, and the compensated fv value corresponding to the sixth frame is obtained based on the fitting straight line to be 14, thus the fv value corresponding to the sixth frame is adjusted to be 14, and the fv value corresponding to the sixth frame is compensated.

In an embodiment, the fv value corresponding to the current frame is compensated in step (2), including: acquiring an average value of an fv value corresponding to a previous frame of the current frame and an fv value corresponding to a next frame of the current frame; and taking the average value as the compensated fv value corresponding to the current frame.

When the mobile phone detects that the fv value the current frame is too small, that is, the fv value of the current frame is deviated, the fv value corresponding to the current frame is compensated. The step of compensating the fv value includes: obtaining a next frame relative to the current frame by the precise scan, and when the rotational angular velocity value of the next frame is within the first threshold, acquiring the fv value corresponding to the next frame, and obtaining the average fv value of the fv value corresponding to the previous frame and the fv value corresponding to the next frame; taking the average fv value as the compensated fv value corresponding to the current frame. For example, during the precise scan, when the mobile phone detects that the rotational angular velocity value of the sixth frame is greater than the first threshold, and the difference between the fv value of the sixth frame and the fv value of the fifth frame is greater than the second threshold, the precise scan is continued to obtain the seventh frame to obtain the rotational angular velocity value of the seventh frame. When the rotational angular velocity value of the seventh frame is within the first threshold, the fv value of the seventh frame is obtained. The average value of the fv value of the fifth frame and the fv value of the seventh frame is taken as the compensated fv value of the sixth frame.

In one embodiment, before acquiring the focusing area by the first scan in step (1), the focusing method includes: acquiring a focus range by a second scan, the step of acquiring the focus range by the second scan comprising: acquiring the fv value corresponding to the current frame, when the fv value corresponding to the current frame being greater than an fv value corresponding to a previous frame, continuing the second scan until the fv value corresponding to the current frame being smaller than the fv value of the previous frame.

The second scan refers to a pre scan. The mobile phone obtains an approximate range of the focus position of the camera lens by the pre scan. Referring to the line graph of FIG. 3, the abscissa represents the lens position, and the ordinate represents the fv value corresponding to the lens position. During the pre scan, the mobile phone drives the camera lens to perform a search with a larger step size. For example, if the total stroke that a motor of the camera can drive is 1000, the step size of the lens driven by the motor is set to 80 during the pre scan, that is, the motor drives the camera lens at a distance of 80 each time, and obtain the fv value corresponding to each frame corresponding to each lens position. Referring to FIG. 3, the camera lens is driven from the point A to the point B, from the point B to the point C, the point C to the point D, the point D to the point E, the point E to the point F, the point F to the point G. During the process from the point A to the point F, the fv value corresponding to the lens position gradually increases. During the process from the point F to the point G, the fv value corresponding to the lens position gradually decreases. Then it means that the camera lens has been passed across a lens position that corresponding to the maximum fv value. Thus, the pre scan is ended, and the precise scan is followed.

In one embodiment, focusing with the compensated fv value includes: acquiring three fv values corresponding to three consecutive frames, in which an fv value corresponding to an intermediate frame of the three frames is greater than an fv value corresponding to a previous frame, and the fv value of the intermediate frame is greater than an fv value corresponding to a next frame; acquiring a fitting curve based on the three fv values; and driving a camera lens to a position corresponding to an apex of the fitting curve and focusing thereby.

In the precise scan, the mobile phone compensates the fv value corresponding to the frame obtained in the precise scan in real time, and focuses according to the compensated fv value. Referring to FIG. 3, when the motor drives the camera lens to reach the G point to complete the pre scan, the precise scan begins. During the precise scan, the step size of the lens driven by the motor is smaller than the pre scan, such as a distance of 30 per drive. The lens driven by the motor is moved back from the G point by 5 steps, that is, from the G point to the H point, from the H point to the I point, from the I point to the J point, from the J point to the K point, from the K point to the L point. In the process from the G point to the J point, the fv value of the lens position gradually increases. In the process from the J point to the point L, the fv value of the lens position gradually decreases. That is, the fv value corresponding to the J point lens position is higher than the fv value corresponding to the I point and the K point. Referring to FIG. 4, a parabola is fitted according to the fv value of the I point, the J point, and the K point to the corresponding lens position, and an apex of the parabola is obtained as the M point. Then the lens is driven by the motor to the lens position corresponding to the M point, which has the highest fv value. The lens focus is completed.

The person of ordinary skill in the art can understand that all or part of the process of implementing the above embodiments can be completed by a computer program to instruct related hardware, and the program can be stored in a non-volatile computer readable storage medium. The program, when executed, may include the flow of an embodiment of the methods as described above. The storage medium may be a magnetic disk, an optical disk, a read-only memory (ROM), or the like.

The above-mentioned embodiments are merely illustrative of several embodiments of the present disclosure, and the description thereof is more specific and detailed, but is not to be construed as limiting the scope of the claims. It should be noted that a number of variations and modifications may be made by those skilled in the art without departing from the spirit and scope of the present disclosure. Therefore, the scope of the invention should be determined by the appended claims.

What is claimed is:

1. A focusing method comprising:
   acquiring an fv value corresponding to a current frame in response to detecting that a rotation angular velocity value corresponding to the current frame is greater than a first threshold during a first scan configured to acquire a focusing area;
   compensating the fv value corresponding to the current frame to obtain a compensated fv value in response to detecting that a difference between the focus value fv corresponding to the current frame and an fv value corresponding to a previous frame is greater than a second threshold; and
   focusing with the compensated fv value.

2. The focusing method according to claim 1, wherein compensating the fv value corresponding to the current frame to obtain a compensated fv value comprises:
   acquiring a fitting straight line according to two fv values respectively corresponding to two previous frame pictures of the current frame; and
   compensating the fv value corresponding to the current frame based on the fitting straight line.

3. The focusing method according to claim 1, wherein compensating the fv value corresponding to the current frame to obtain a compensated fv value comprises:
   acquiring an average value of an fv value corresponding to a previous frame of the current frame and an fv value corresponding to a next frame of the current frame; and
   taking the average value as the compensated fv value corresponding to the current frame.

4. The focusing method according to claim 1, wherein before acquiring the focusing area by the first scan, the focusing method further comprises:
   acquiring a focus range by a second scan, comprising:
      acquiring the fv value corresponding to the current frame in response to the fv value corresponding to the current frame being greater than an fv value corresponding to a previous frame, continuing the second scan until the fv value corresponding to the current frame being smaller than the fv value of the previous frame.

5. The focusing method according to claim 4, wherein a step size of the second scan is larger than a step size of the first scan.

6. The focusing method according to claim 4, wherein the focusing area is located in the focus range.

7. The focusing method according to claim 1, wherein focusing with the compensated fv value comprises:
   acquiring three fv values of three consecutive frames, wherein an fv value of an intermediate frame of the three frames is greater than an fv value of a previous frame, and the fv value of the intermediate frame is greater than an fv value of a next frame;
   acquiring a fitting curve based on the three fv values; and
   driving a camera lens to a position corresponding to an apex of the fitting curve and focusing thereby.

8. The focusing method according to claim 1, wherein acquiring an fv value corresponding to a current frame in response to detecting that a rotation angular velocity value corresponding to the current frame is greater than a first threshold during a first scan configured to acquire a focusing area comprises:
   obtaining the rotation angular velocity value of a camera lens by a gyro detector of a mobile terminal.

9. The focusing method according to claim 8, wherein the camera lens and the gyro detector are disposed inside the mobile terminal.

10. A mobile phone, comprising a memory and a processor, wherein the memory stores a computer program, and the computer program is executed by the processor to perform:
    acquiring an fv value corresponding to a current frame in response to detecting that a rotation angular velocity value corresponding to the current frame is greater than a first threshold during a first scan configured to acquire a focusing area;
    compensating the fv value corresponding to the current frame to obtain a compensated fv value in response to detecting that a difference between the focus value fv corresponding to the current frame and an fv value corresponding to a previous frame is greater than a second threshold; and
    focusing with the compensated fv value.

11. The mobile phone according to claim 10, wherein compensating the fv value corresponding to the current frame to obtain a compensated fv value by the processor comprises:
    acquiring a fitting straight line according to two fv values respectively corresponding to two previous frame pictures of the current frame; and
    compensating the fv value corresponding to the current frame based on the fitting straight line.

12. The mobile phone according to claim 10, wherein compensating the fv value corresponding to the current frame to obtain a compensated fv value by the processor comprises:
    acquiring an average value of an fv value corresponding to a previous frame of the current frame and an fv value corresponding to a next frame of the current frame; and
    taking the average value as the compensated fv value corresponding to the current frame.

13. The mobile phone according to claim 10, wherein when the computer program is executed by the processor, before acquiring the focusing area by the first scan, the processor further performs:
    acquiring a focus range by a second scan, comprising:
       acquiring the fv value corresponding to the current frame in response to the fv value corresponding to the current frame being greater than an fv value corresponding to a previous frame, continuing the second scan until the fv value corresponding to the current frame being smaller than the fv value of the previous frame.

14. The mobile phone according to claim 10, wherein focusing with the compensated fv value by the processor comprises:
    acquiring three fv values of three consecutive frames, wherein an fv value of an intermediate frame of the three frames is greater than an fv value of a previous frame, and the fv value of the intermediate frame is greater than an fv value of a next frame;

acquiring a fitting curve based on the three fv values; and
driving a camera lens to a position corresponding to an apex of the fitting curve and focusing thereby.

15. A non-transitory computer readable storage medium, configured to store a computer program, the computer program being executed by a processor to perform:
acquiring an fv value corresponding to a current frame in response to detecting that a rotation angular velocity value corresponding to the current frame is greater than a first threshold during a first scan configured to acquire a focusing area;
compensating the fv value corresponding to the current frame to obtain a compensated fv value in response to detecting that a difference between the focus value fv corresponding to the current frame and an fv value corresponding to a previous frame is greater than a second threshold; and
focusing with the compensated fv value.

16. The non-transitory computer readable storage medium according to claim 15, wherein compensating the fv value corresponding to the current frame to obtain a compensated fv value by the processor comprises:
acquiring a fitting straight line according to two fv values respectively corresponding to two previous frame pictures of the current frame; and
compensating the fv value corresponding to the current frame based on the fitting straight line.

17. The non-transitory computer readable storage medium according to claim 15, wherein compensating the fv value corresponding to the current frame to obtain a compensated fv value by the processor comprises:
acquiring an average value of an fv value corresponding to a previous frame of the current frame and an fv value corresponding to a next frame of the current frame; and
taking the average value as the compensated fv value corresponding to the current frame.

18. The non-transitory computer readable storage medium according to claim 15, wherein when the computer program is executed by the processor, before acquiring the focusing area by the first scan, the processor further performs:
acquiring a focus range by a second scan, comprising:
acquiring the fv value corresponding to the current frame in response to the fv value corresponding to the current frame being greater than an fv value corresponding to a previous frame, continuing the second scan until the fv value corresponding to the current frame being smaller than the fv value of the previous frame.

19. The non-transitory computer readable storage medium according to claim 18, wherein a step size of the second scan is larger than a step size of the first scan.

20. The non-transitory computer readable storage medium according to claim 15, wherein focusing with the compensated fv value by the processor comprises:
acquiring three fv values of three consecutive frames, wherein an fv value of an intermediate frame of the three frames is greater than an fv value of a previous frame, and the fv value of the intermediate frame is greater than an fv value of a next frame;
acquiring a fitting curve based on the three fv values; and
driving a camera lens to a position corresponding to an apex of the fitting curve and focusing thereby.

* * * * *